United States Patent [19]
Ranz et al.

[11] Patent Number: 5,513,378
[45] Date of Patent: Apr. 30, 1996

[54] MAINTAINING COMMUNICATIONS AFTER CONTROL BREAKS IN A TRUNKED COMMUNICATION SYSTEM

[76] Inventors: Stephen J. Ranz, 496 Arlington, Elmhurst, Ill. 60126; William A. Felderman, 1310 Springbeach Rd., Cary, Ill. 60013

[21] Appl. No.: 905,958

[22] Filed: Jun. 29, 1992

[51] Int. Cl.⁶ .................................................. H04B 7/00
[52] U.S. Cl. ................................ 455/8; 455/9; 455/67.1
[58] Field of Search .............................. 455/8, 9, 11.1, 455/13, 14, 53.1, 56.1, 67.1; 379/4, 22, 26, 33, 44; 371/8.2

[56] References Cited

U.S. PATENT DOCUMENTS

| | | |
|---|---|---|
| 4,570,261 | 2/1986 | Maher . |
| 4,835,731 | 5/1989 | Nazarenko et al. . |
| 4,905,302 | 2/1990 | Childress et al. . |
| 4,939,746 | 7/1990 | Childress . |
| 5,086,506 | 2/1992 | Hall et al. .................... 455/8 |

OTHER PUBLICATIONS

E. F. Johnson, "Clearchannel Ltr®" Application Note, Copy Right 1988 by E. F. Johnson, pp. 2–1 through 2–8.

*Primary Examiner*—Reinhard J. Eisenzopf
*Assistant Examiner*—Thanh Le
*Attorney, Agent, or Firm*—Susan L. Lukasik

[57] ABSTRACT

In a trunked communication system with a number of repeaters (101, 103, 105, 107), allocation of communication resources within each coverage area is controlled by one of the repeaters, which acts as an active resource controller. Communication resource control information is distributed between the repeaters via a data network (109). When a break (113) is detected (403) in the data network (109), a secondary communication unit (117) sends a notice of the break (405) to the plurality of repeaters located on each side of the break. The active resource controller determines which side of the break provides desired usage of the communication resources, and communications are maintained by that side (505, 509).

8 Claims, 2 Drawing Sheets

5,513,378

MAINTAINING COMMUNICATIONS AFTER CONTROL BREAKS IN A TRUNKED COMMUNICATION SYSTEM

FIELD OF THE INVENTION

This invention relates to trunked communications, including but not limited to distribution of control for allocation of communication resources in a trunked communications system.

BACKGROUND OF THE INVENTION

Trunked communication systems are known to comprise a plurality of communication units, a limited number of communication resources that are transceived via a predetermined number of repeaters, or base stations, and a communication resource allocator that allocates the limited number of communication resources among the plurality of communication units. The communication units may be portable radios and/or mobile radios. The communication resources may comprise a TDM (time-division multiplexed) bus, a carrier frequency, a pair of carrier frequencies, or any RF (radio frequency) transmission means.

In many systems, the communication resource allocator for each coverage area is a distributed infrastructure connected to each of the repeaters via a local area network. One repeater is designated as an active resource controller, also called an active master, which allocates communications resources for all requests in the coverage area via the local area network. Although only one repeater maintains this function for a coverage area, two or more, perhaps even all, repeaters in each coverage area are capable of performing as the active resource controller, in case a repeater goes down for service or some other reason. When the active resource controller goes down, the remaining repeaters choose a new active resource controller, and communications continue.

If the local area network develops a break, thus separating the active resource controller from any number of repeaters, the separated repeaters choose a new active resource controller, thus two active resource controllers and hence two systems exist for the same coverage area. This will cause turmoil in resource allocation, because both controllers may allocate the same resource to different users at the same time, or allocate different resources to the same user for one call. Further difficulties arise when a group call must be established, as some units from a group may be assigned to one system, and other units from the same group may be assigned to the other system, resulting in group members missing group calls. Many other undesirable communication trouble may result when a single system splits into two separate systems. Because this situation must be avoided, a method of reestablishing unified control of the resources on both sides of the break in the local area network is required.

DESCRIPTION OF A PREFERRED EMBODIMENT

The following describes a method and apparatus that provides a single source of control for a trunked communications system when a break develops in the data network that conveys messages allocating communications resources for communication requests within a coverage area. The single source of control maintains communications for the coverage area while optimizing usage of the available resources given the break in the data network.

Figure 1:
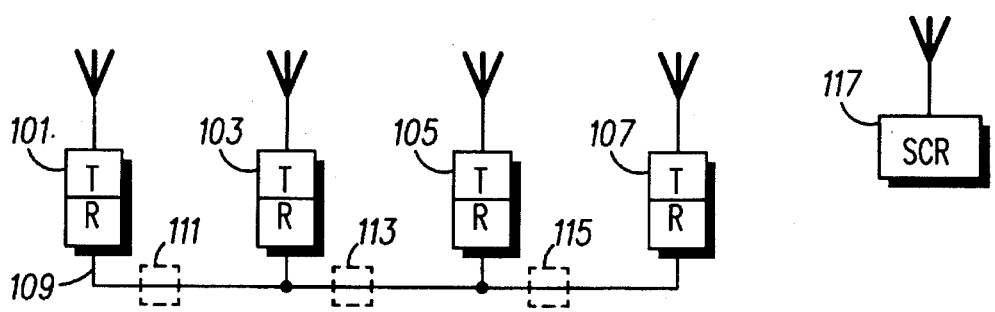
FIG. 1 is a block diagram of a trunked communication system in accordance with the invention.
Figure 6:
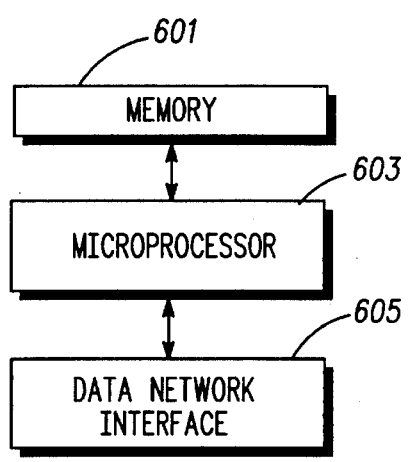
FIG. 6 is a block diagram of a part of a repeater in a trunked communication system in accordance with the invention.

A plurality of repeaters 101, 103, 105, and 107 in a coverage area of a trunked communication system is shown in FIG. 1. A coverage area may be an entire communication system or a part of a communication system. Although the present invention may be applied to any number of repeaters in a coverage area, only four repeaters are shown to simplify the drawings and descriptions that follow. As shown in FIG. 6, each repeater, such as a Motorola IntelliRepeater, includes a microprocessor 603, such as a Motorola 68302 microprocessor, and digital memory 601, which may be RAM, ROM, or any other type of digital storage means. Also included in each repeater is a data network interface 605 that is operably coupled to a data network 109, which distributes communication resource control information between the repeaters 101, 103, 105, and 107. The data network 109 may be wireline, RF, fiber optic, or any type or combination of communication media. Any one of the repeaters functions as an active resource controller, or active controller, that allocates communication resources within the coverage area by sending control messages through the data network 109 to the appropriate repeaters. The first repeater 101 will be considered the active controller for illustrative purposes in the following descriptions.

The data network 109 may experience one or more breaks 111, 113, and 115 in communications, which may be a split of a physical wire, a failure of an RF transmitter, continuous noise interference, and so forth. Such a break 111, 113, and 115 may occur anywhere along the data network 109, separating any number of repeaters from the active controller 101.

In the event that the active controller 101 fails or in any way loses control of the coverage area, one of the remaining repeaters 103, 105, or 107 takes over and becomes the new active controller. If a break 111, 113, or 115 develops in the data network 109, one of the repeaters separated from the active controller 101 will attempt to act as the new active controller (105 for this example). In this situation, one coverage area has two separate and independent active controllers, and hence two separate and independent systems handling communications. Two independent systems for one coverage area and one group of users can cause numerous problems, including allocation of different resources to the same call, allocation of the same resource to different calls, missing group members for talkgroup calls, and so forth. In order to maintain efficient communications in the coverage area and prevent poor distribution of communication resources within the coverage area, no coverage area should have more than one active controller 101. Thus, the active controller 101 and new active controller 105 (or new active controllers if more than one break occurs) must communicate with each other to determine whether the active controller 101 or new active controller 105 should remain active by distributing only the resources available to a particular controller over the coverage area.

The trunked communications system of FIG. 1 also includes at least one system configuration radio (SCR) 117 which provides a secondary RF communications resource with which repeaters can communicate. In the preferred embodiment, the system configuration radio 117 is an off-the-shelf trunking radio. When a break 113 develops in the data network 109, the system is divided into two segments: the active side, which is the segment of the data network 109 that contains the active controller 101 when the break occurs, and the inactive side, which is the segment of the data network 109 that does not contain the active controller 101 when the break occurs.

Figure 2:
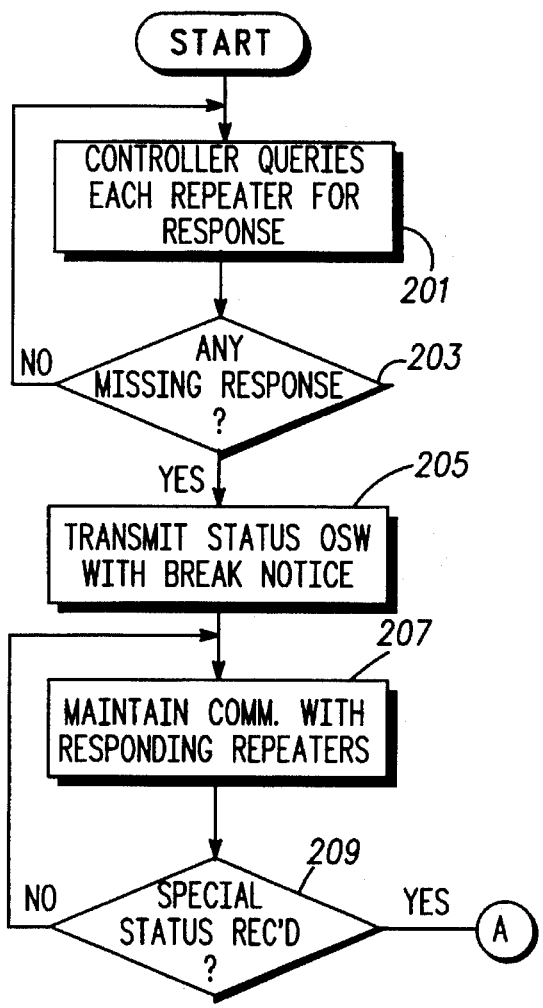
FIG. 2 and FIG. 3 are flowcharts showing detection of breaks in accordance with the invention.

The process of FIG. 2 takes place in the active controller 101. The active controller 101 periodically queries each repeater on the data network 109 for a response at step 201. When a repeater fails to respond to the query at step 203, the active controller 101 periodically transmits to the system configuration radio 117 a status OSW (Outbound Signalling Word) that includes a break notice, which indicates that the data network 109 is fragmented, and resource information for the active side of the break at step 205. The resource information may include the member of resources on the active side of the break, which control channels are available, and so forth. The status OSW is transmitted on one of a known group of channels, typically a control channel, such that the system configuration radio 117 can pick up the transmission in a scan of all of the known group of channels.

At step 207, the active controller 101 continues to control the system normally while looking for break notices from the other segment in the coverage area. If the current control channel for the system is on the inactive side of the break, the active controller 101 assigns a new control channel for the active side. When the active controller 101 receives from the SCR 117 a special status ISW (Inbound Signalling Word) including a break notice and resource information from the inactive side of the data network 109 at step 209, the process continues with step 501 of FIG. 5.

Figure 3:
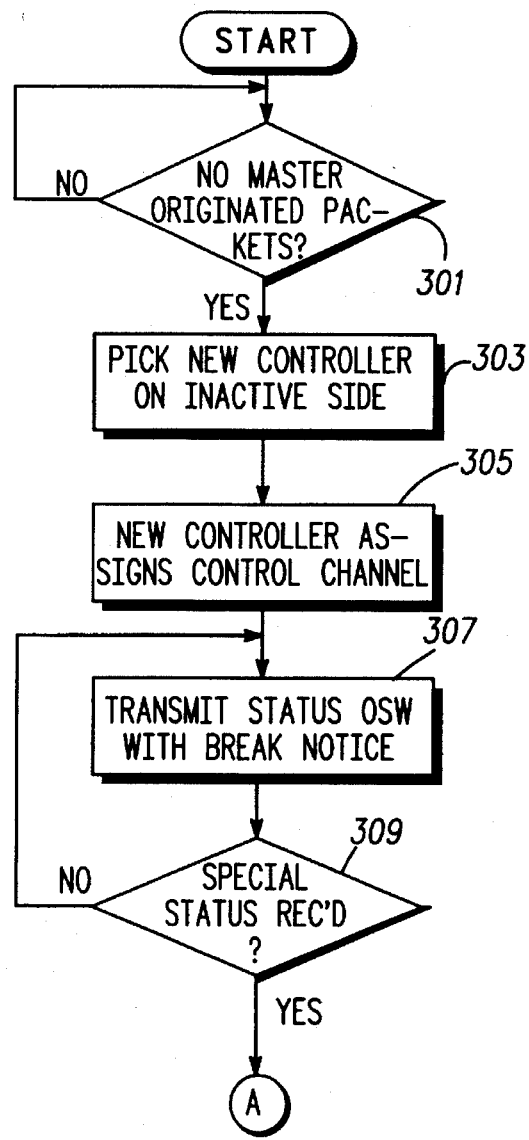

The process of FIG. 3 takes place in each repeater 103, 105, and 107 which is not the active controller 101. At step 301, when a repeater does not see a message or message packets originated by the active controller 101, or master, on the data network 109 during a predetermined period of time, a new active controller 105 is selected for this part of the network at step 303. The new active controller 105 assigns a control channel at step 305, if the current control channel does not exist on the inactive side of the break. At step 307, the new active controller 105 periodically transmits to the system configuration radio 117 a status OSW including a break notice, which indicates that the data network 109 has been fragmented, and resource information for the inactive side of the break at step 307. The resource information may include the number of resources on the inactive side of the break, which and how many control channels are available, and so forth. The status OSW is transmitted on one of a known group of channels, typically a control channel, such that the system configuration radio 117 can pick up the transmission in a scan of all of the known group of channels. When the new active controller 105 receives from the system configuration radio 117 a special status ISW including a break notice and resource information from the inactive side of the data network 109 at step 309, the process continues with step 501 of FIG. 5. Because it is possible that more than one break may have developed in the data network 109, this process yields a new active controller for each segment of the data network where one or more repeaters exist. The new active controller 105 does not allocate resources unless the inactive side is determined to have the optimal system configuration, as described for step 505 of FIG. 5.

Figure 4:
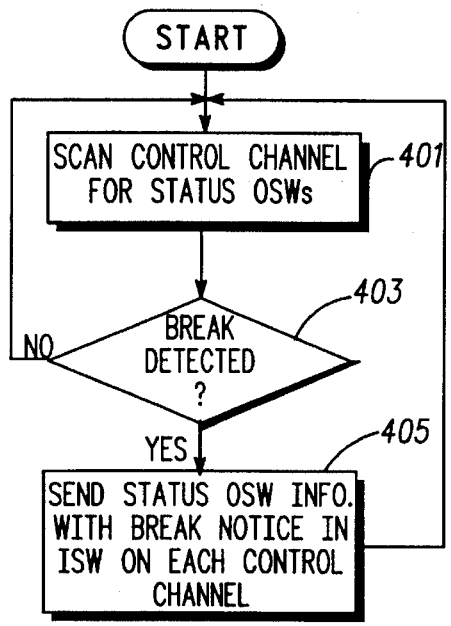
FIG. 4 and FIG. 5 are flowcharts showing system control after detection of a break in accordance with the invention.

The operation of the system control radio 117 of FIG. I is shown in FIG. 4. At step 401, the system control radio 117 continually scans the known group of channels, typically all possible control channels of the coverage area, for status OSWs from the repeaters 101, 103, 105, and 107. When a break 113 is detected at step 403, the system control radio 117 sends a special status ISW at step 405 on each of the known group of channels, typically all possible control channels of the coverage area. The special status ISW includes the status OSW information, in particular a break notice and the resource information received from the active controller 101 and each new active controller 105. At step 403, a break is detected when the system control radio 117 receives a status OSW with a break notice from one of the repeaters in the coverage area.

Figure 5:
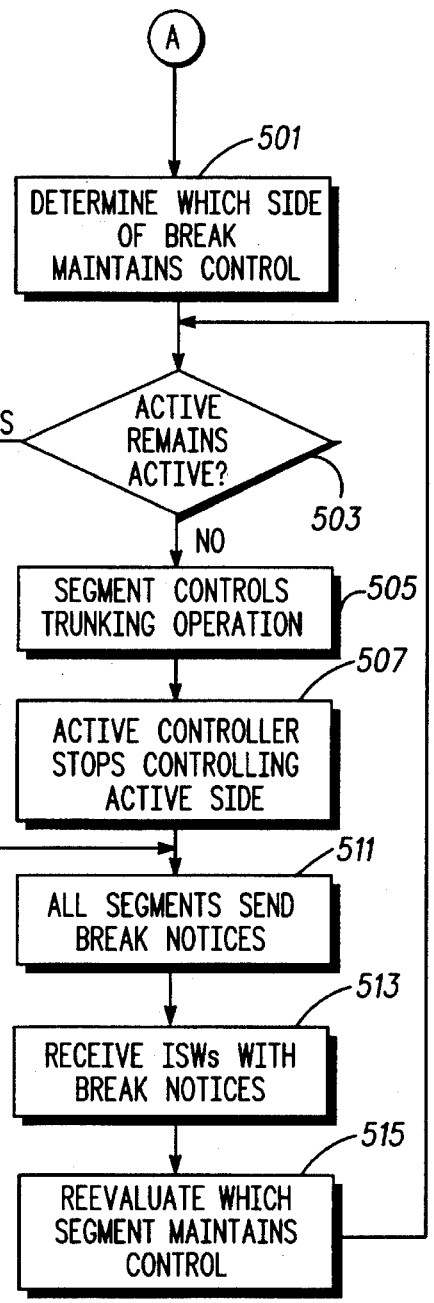

At step 501 of FIG. 5, the active controller 101 and the new active controller 105 determine which side of the break 113, and in particular whether the active controller 101 or the new active controller 105 will become the current active controller, i.e., the controller that maintains control of its communication resources in the coverage area after a data network break 113. In general, it is desired to provide optimal usage of the available communication resources to the coverage area. This may be achieved simply by comparing a count of the resources in each segment and selecting the active controller with the largest number of resources in its segment of the data network 109. The number of available control channels may also be used in the determination.

If at step 503 the active side controller is to be the current active controller for the coverage area, the active controller 101 maintains the communication resources on the active side of the break at step 509, and the process continues with step 511. In this instance, the communication resources on the inactive side of the break remain idle.

If at step 503 the active side controller is not to become the current active controller for the coverage area, the new active controller 105 takes control as the current active controller of the coverage area and allocates communication resources from its segment of the data network 109 to handle communication requests in the area at step 505. The active controller 101 stops controlling communication resources on the active side of the break at step 507, i.e., the active side resources remain idle, and the process continues with step 511.

When one side of the break goes idle, thus taking away one control channel, one controller issues an OSW informing the communication units of the identity of the remaining control channel. Alternatively, the communication units may scan through a list of known control channels until the other control channel is found.

At step 511, the active controller 101 or new active controller 105 for each segment of the data network 109 continues to send periodic status OSWs with break notices as in step 205 or step 307 as long as the break remains. At step 513, the active controllers continue to receive special status ISWs with break notices from the system control radio 117 as long as the break remains in the data network 109. At step 515, the current active controller 101 or 105 reevaluates which active controller of which segment should maintain control of the coverage area. This reevaluation is similar to the evaluation done in step 501, except that the current status of all resources (as received in the special status ISWs at step 513) is used to make the evaluation, in case more or less resources are available, or a new break emerges in the data network 109. The process then continues with step 503.

Thus, the present invention provides a mechanism to detect breaks in a data network and provides a communication resource to transfer control information between all segments of the network. Separate trunked communications systems are prevented from coexisting in the same coverage area when a break occurs in the data network by selecting a single active controller with optimal resources to handle the appropriate repeaters of the coverage area.

What is claimed is:

1. A method of distributing control in a trunked communication system with distributed control of allocation of communication resources amongst a plurality of repeaters in a coverage area via a data network between at least two of the plurality of repeaters, comprising the steps of:

detecting a break in the data network;

sending by a radio a notice of the break to the plurality of repeaters located on each side of the break;

determining which side of the break provides desired usage of the communication resources;

maintaining the side of the break with said desired usage.

2. The method of claim 1, further comprising the step of reevaluating which side of the break continues to provide desired usage of the communication resources.

3. The method of claim 1, wherein the detecting step further comprising the steps of:

querying, by an active controller, each of the plurality of repeaters for a response;

transmitting, by the active controller, a status message with a break notice on a communication resource provided by the radio when any of the plurality of repeaters fails to send a response; and scanning, by a communication unit, the communication resource for status messages.

4. The method of claim 1, wherein the detecting step further comprising the steps of:

transmitting, by an active controller, an active controller status message to each of the plurality of repeaters;

determining, by at least one of the plurality of repeaters, if the active controller status message was not received by any of the plurality of repeaters;

picking a second controller from among any of the plurality of repeaters that did not receive the active controller status message; and transmitting, by the second controller, a status message with a break notice on the communication resource.

5. A trunked communication system with distributed control of allocation of communication resources amongst a plurality of repeaters in a coverage area via a data network, the trunked communication system comprising:

means for detecting a break in the data network;

means, coupled to said means for detecting, for sending via a communication resource a notice of the break to the plurality of repeaters located on each side of the break;

means, coupled to said means for detecting, for determining which side of the break provides desired usage of the communication resources;

means, coupled to said means for determining, for maintaining the side of the break with said desired usage.

6. The system of claim 5, further comprising means for reevaluating which side of the break continues to provide desired usage of the communication resources.

7. The system of claim 5, wherein the means for detecting further comprises:

means for querying, by an active controller, each of the plurality of repeaters for a response;

means, coupled to said means for querying, for transmitting, by the active controller, a status message with a break notice on the communication resource when any of the plurality of repeaters fails to send a response; and means for scanning, by a communication unit, the communication resource for status messages.

8. The system of claim 5, wherein the means for detecting further comprises:

means for transmitting, by an active controller, an active controller status message to each of the plurality of repeaters;

means for determining, by at least one of the plurality of repeaters, if the active controller status message was not received by any of the plurality of repeaters;

means, coupled to said means for determining, for picking a second controller from among any of the plurality of repeaters that did not receive the active controller status message; and means, coupled to said means for picking, for transmitting, by the second controller, a status message with a break notice on the communication resource.

* * * * *